T. H. HOOD.
FUMIGATING APPARATUS.
APPLICATION FILED AUG. 22, 1910.
991,310.
Patented May 2, 1911.
2 SHEETS—SHEET 1.
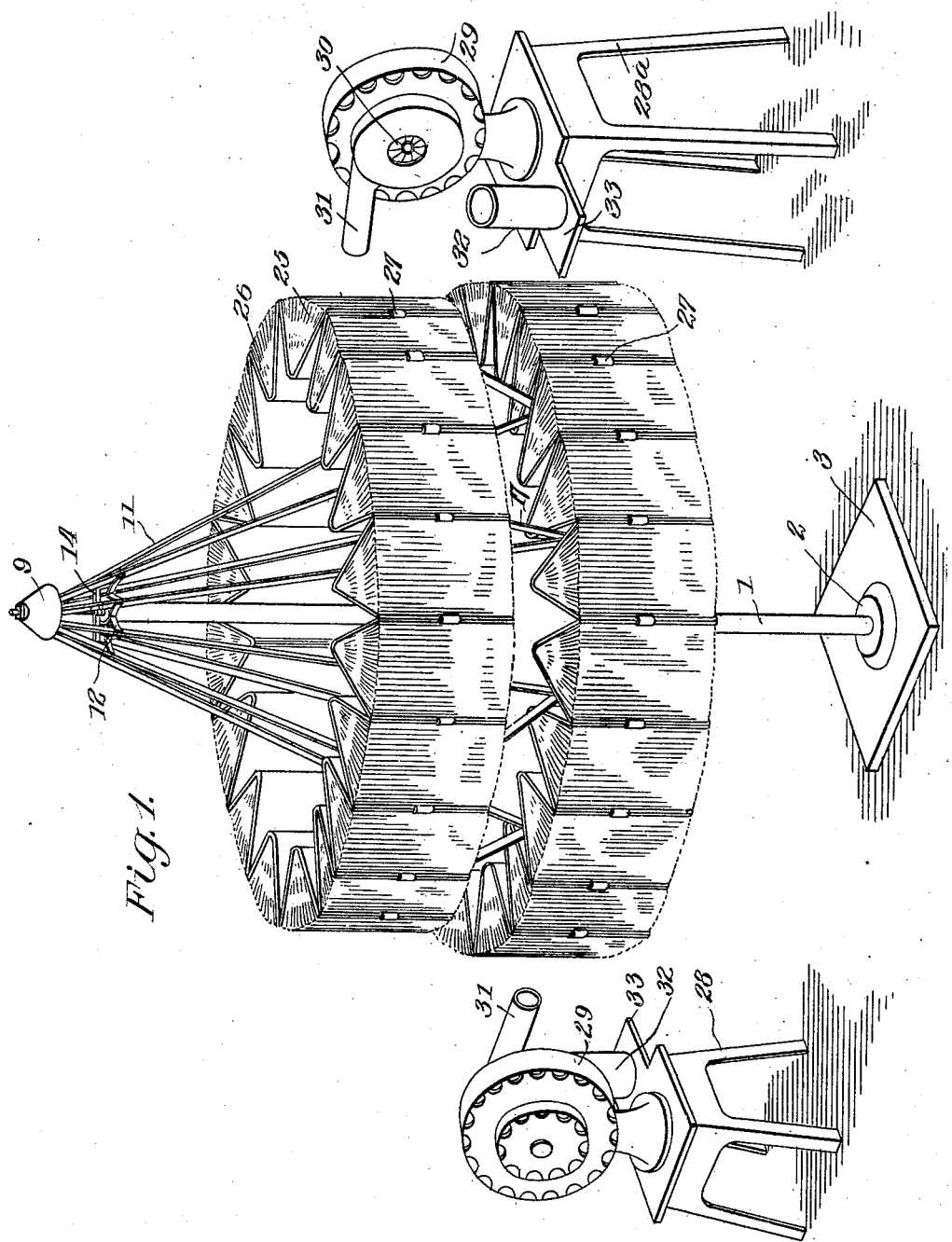
WITNESSES:
INVENTOR
Thomas H. Hood
BY
ATTORNEYS

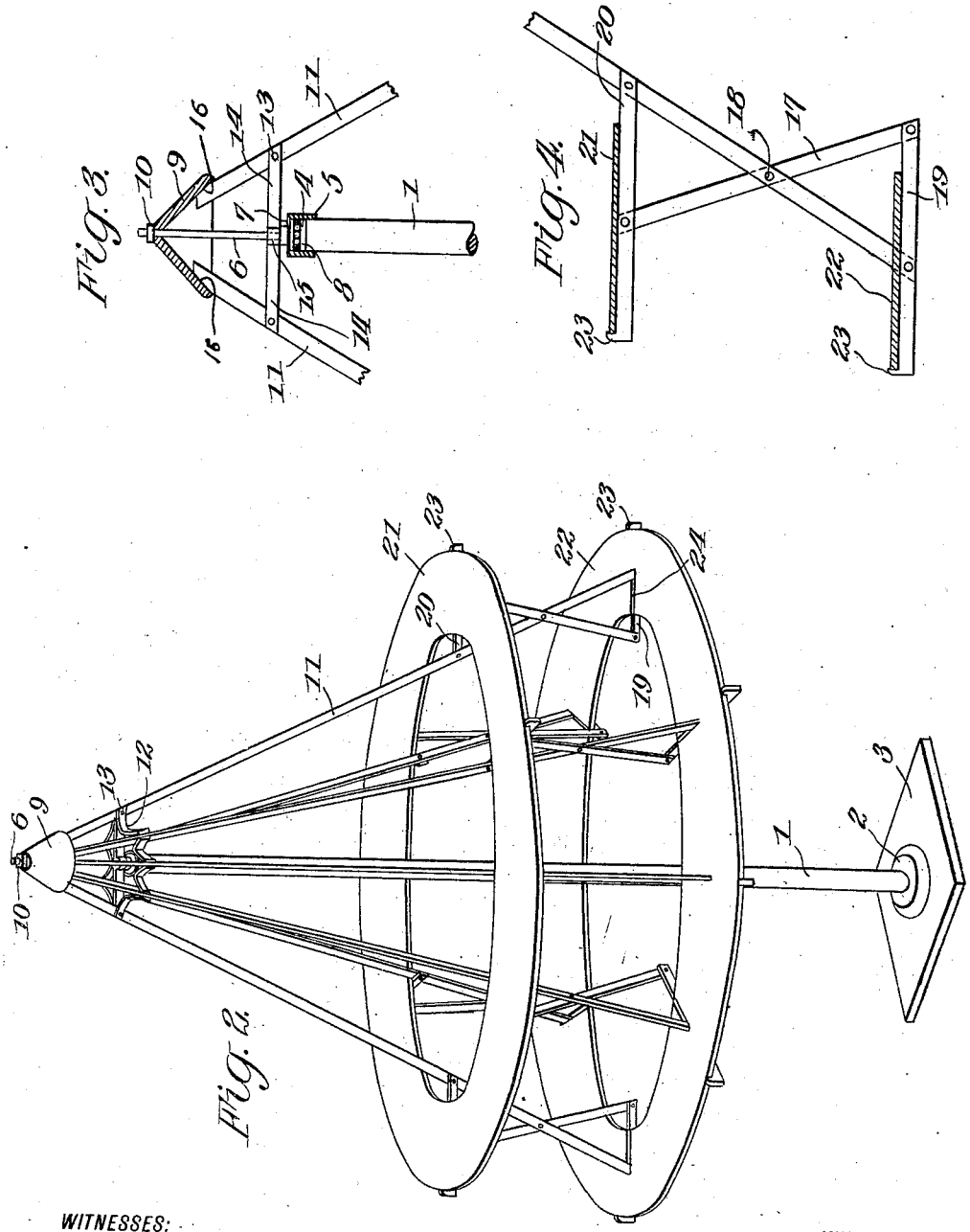

UNITED STATES PATENT OFFICE.

THOMAS HOWARD HOOD, OF GREENVILLE, MISSISSIPPI.

FUMIGATING APPARATUS.

991,310.  Specification of Letters Patent.  Patented May 2, 1911.

Application filed August 22, 1910. Serial No. 578,379.

*To all whom it may concern:*

Be it known that I, THOMAS H. HOOD, a citizen of the United States, and a resident of Greenville, in the county of Washington and State of Mississippi, have made certain new and useful Improvements in Fumigating Apparatus, of which the following is a specification.

My invention is an improvement in fumigating apparatus and consists in certain novel constructions, and combinations of parts, hereinafter described and claimed.

The object of the invention is to provide a simple and easily operated apparatus of the character specified, especially designed for fumigating books, pamphlets and the like, wherein a large number of books may be fumigated at one time without injury to the books, and the medicament applied to each and every page, and wherein the act of applying the medicament will operate the apparatus to bring each of the books in turn into the best possible position for receiving the said medicament.

Referring to the drawings forming a part hereof—Figure 1 is a perspective view of the apparatus in operation. Fig. 2 is a perspective view of the support for the articles, Fig. 3 is a vertical section of the top of the support, and Fig. 4 is a vertical section of the shelves.

The embodiment of the invention shown in the drawings, consists of a standard 1, which is supported in a step bearing 2, in a base 3. The standard is provided at its upper end with a circular cap plate or disk 4 and a ring or ferrule 5 encircles the end of the standard, the upper edge of the ring extending above the plate 4.

A rod 6 is arranged in alinement with the standard, and the said rod is provided at its lower end with a circular plate or disk 7 fitting within the ring, and spaced from the cap plate 4 by a ball bearing 8. A conical hood or canopy 9 is provided with a central opening through which passes the upper end of the rod, and a nut 10 is threaded onto the rod above the hood.

A plurality of arms 11 extend downwardly and outwardly from the canopy, the arms being arranged at equal angular distances from each other, and the adjacent arms are connected below the canopy by a substantially V-shaped bracket 12, one of whose arms is secured by bolts or rivets 13 to one of the arms 11 and the other to the adjacent arm 11.

The brackets 12 hold the arms in inclined position, and in spaced relation, and a cross bar 14 is connected to a collar 15 on the rod intermediate its ends, and by each end to diametrically opposite arms 11 by the bolts or rivets before mentioned.

The upper ends of the arms 11 are beveled as shown at 16 and engage the inner face of the canopy. Each arm is provided at its lower end with a cross bar 17 intermediate its ends pivoted to the arm 11 at 18, a short distance from the lower end thereof. The lower end of the cross bar is connected to the lower end of the arm 11 by a horizontal bar 19, and the upper end of the cross bar is connected to the arm by a similar parallel bar 20.

A ring shaped or annular plate 21 is supported on the bars 20 of the arms, and a similar plate 22 is supported in the bars 19. Each of the bars 19 and 20 is provided at its outer end with a lug or projection 23, and the lower plate 22 is slotted on its inner edge at 24 at each of the arms 11 to receive the said arm, the plate extending inside of the arm as shown on Fig. 4.

The plates 21 and 22 are held in place by the lugs 23, and the frame formed by the arms 11, plates 21 and 22, arms 19 and 20 and cross bars 17 is rotatable on the standard 1. The said frame is composed of light material, and the shelves formed by the plates 21 and 22 are adapted to receive the books 25 to be fumigated (Fig. 1). The said books are arranged with one end on the shelf and with the backs inwardly and spaced apart slightly from each other as shown. The covers 26 of each book are held to the adjacent cover of the book on each side, by a substantially U-shaped clamp 27, so that the leaves of the book are free to move with respect to each other.

A plurality of tables 28 and 28$^a$ is arranged adjacent to the support, one table on each side and at diametrically opposite points, and a fan casing 29 containing a fan of any usual or desired construction, is supported on each table. Each of the fans is provided with an axial opening 30, and with an outlet spout 31.

One of the tables 28 is of lesser height than the other, and the outlet spout or pipe 31 of the fan on the said table is on a level with the books on the lower shelf, while the spout of the fan on the table 28ᵃ is on a level with the books on the upper shelf. A jar 32 for containing a disinfectant is arranged on an extension 33 of the table and with the top of the jar near the axial opening.

The outlet spout 31 of the jar casings have their long axes tangential to the frame, and each spout delivers at approximately the vertical center of the books, as shown in Fig. 1.

In operation, the books being placed and the clamps arranged to hold the covers in the position shown, the fans are started. Each fan delivers tangential to the frame and the frame is rotated by the current of air set up by the fans. As the frame rotates each book is brought in turn directly in front of the outlet and the vapor from the disinfectant in the jar is sucked into the fan and delivered against the leaves of the book.

The current delivered by the fans flutter the leaves so that every page receives its share of the disinfectant. The apparatus is preferably arranged in a close room. The apparatus is easily taken apart by removing the canopy and shelves when the arms may be folded against the standard, and the standard removed from the bearing.

I claim:

1. A device of the character specified, comprising a standard, a base having a step bearing for engagement by the standard, a ring encircling the top of the standard, a cap on the standard in the ring, a rod provided with a disk fitting in the ring, a ball bearing between the cap and the disk, a conical canopy or hood having a central opening through which the rod passes, a nut engaging the rod above the canopy, a collar on the rod below the canopy, a cross bar connected intermediate its ends with the collar, a plurality of arms arranged at equal angular distances from each other around the standard and inclining downwardly and outwardly from the standard, each arm having its upper end engaging the inner face of the canopy, brackets connecting each arm with the adjacent arms, a cross bar pivoted to each arm near its lower end, a horizontal bar connecting each end of the cross bar with the arm, and an annular shelf supported on the horizontal bars at each end of the cross bar, each of the horizontal bars having a lug at its outer end for engagement by the edge of the adjacent shelf.

2. A device of the character specified, comprising a standard, a base for supporting the standard, a frame encircling the standard and comprising a plurality of arms arranged in spaced relation, each arm inclining outwardly and downwardly from the standard, a conical hood at the upper ends of the arms, said arms engaging the inner face of the hood, means for rotatably supporting the hood on the standard, a cross bar pivoted intermediate its ends to each of the arms near its lower end, a horizontal bar connecting each end of the cross bar with the arm and an annular shelf supported on the bars at each end of the cross bar.

3. A device of the character specified, comprising a standard, a frame encircling the standard composed of a plurality of arms inclining downwardly and outwardly from the standard, a plurality of annular shelves supported in spaced relation on the lower ends of the arms, means for rotatably supporting the frame on the standard, and a means for generating an air current arranged adjacent to each of the shelves and delivering tangentially thereto.

4. A device of the character specified, comprising a frame substantially circular in cross section and tapering from its top downwardly and outwardly, a plurality of annular shelves for books supported horizontally and in spaced relation near the lower end of the frame, means for supporting the frame for rotation, and a means for generating a current of air arranged adjacent to each shelf and delivering tangential thereto, and means for supplying a disinfectant vapor to each of said means.

5. A device of the character specified, comprising a frame substantially circular in cross section and tapering from its top downwardly and outwardly, a plurality of annular shelves for books supported horizontally and in spaced relation near the lower end of the frame, means for supporting the frame for rotation, and a means for generating a current of air arranged adjacent to each shelf and delivering tangential thereto.

6. A device of the character specified, comprising a frame mounted for rotation on a vertical axis, a plurality of annular shelves for books supported by the frame in vertically spaced relation, a fan arranged adjacent to each shelf for delivering a current of air against the books on the shelf, each of said fans delivering tangential to the shelf and having an axial air inlet, and means for containing a disinfectant adjacent to the inlet.

7. A device of the character specified, comprising a frame mounted for rotation on a vertical axis, a plurality of annular shelves for books supported by the frame in vertically spaced relation, a fan arranged adjacent to each shelf for delivering a current of air against the books on the shelf, each of said fans delivering tangential to the shelf.

8. A device of the character specified, comprising a frame mounted for rotation on a vertical axis, a plurality of annular shelves for books supported by the frame in vertically spaced relation, and a means for delivering a current of disinfectant vapor against the books on each shelf and tangential to the shelf, said means delivering in the same direction whereby to rotate the frame.

9. A device of the character specified, comprising a frame mounted for rotation, a plurality of annular shelves for containing books supported by the frame, means for detachably connecting the covers of each book to the adjacent covers of the adjacent books, and means for delivering a current of air against the books on each shelf thereby rotating the frame.

10. A device of the character specified, comprising a frame mounted for rotation, book supporting shelves supported by the frame, means for detachably connecting the covers of each book to the adjacent covers of the adjacent books, and means for delivering a current of air against the books on each shelf, thereby rotating the frame.

11. A device of the character specified, comprising a frame mounted for rotation, book supporting shelves supported by the frame, and means for delivering a current of air against the books on each shelf, thereby rotating the frame.

THOMAS HOWARD HOOD.

Witnesses:
OTTO WINEMAN,
R. C. SHELTON.

Copies of this patent may be obtained for five cents each, by addressing the "Commissioner of Patents, Washington, D. C."